W. A. SONNENTAG.
RESILIENT WHEEL.
APPLICATION FILED SEPT. 25, 1915.

1,173,885.

Patented Feb. 29, 1916.
2 SHEETS—SHEET 1.

Witnesses
Chas. H. Trotter
H. F. Riley

Inventor
Wm. A. Sonnentag
By
Attorney

THE COLUMBIA PLANOGRAPH CO., WASHINGTON, D. C.

W. A. SONNENTAG.
RESILIENT WHEEL.
APPLICATION FILED SEPT. 25, 1915.
1,173,885.
Patented Feb. 29, 1916.
2 SHEETS—SHEET 2.
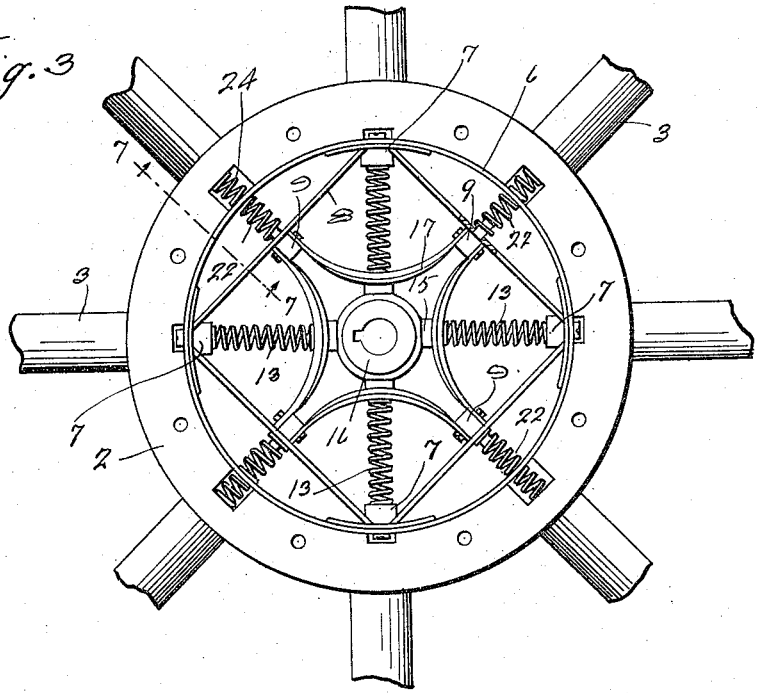
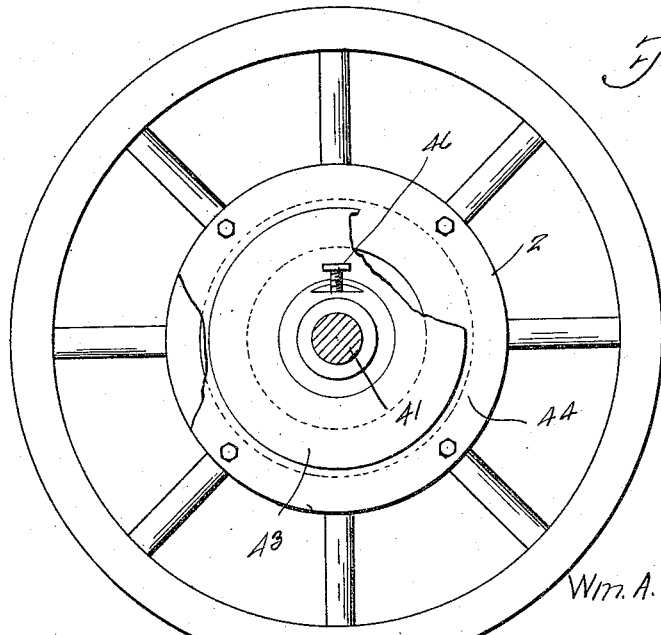
Witnesses
Inventor
Wm. A. Sonnentag
By
Attorney

UNITED STATES PATENT OFFICE.

WILLIAM A. SONNENTAG, OF BOYD, WISCONSIN.

RESILIENT WHEEL.

1,173,885.     Specification of Letters Patent.     Patented Feb. 29, 1916.

Application filed September 25, 1915. Serial No. 52,716.

*To all whom it may concern:*

Be it known that I, WILLIAM A. SONNENTAG, a citizen of the United States, residing at Boyd, in the county of Chippewa and State of Wisconsin, have invented certain new and useful Improvements in Resilient Wheels; and I do hereby declare the following to be a full, clear, and exact description of the invention, such as will enable others skilled in the art to which it appertains to make and use the same.

The invention relates to improvements in resilient wheels.

The object of the present invention is to improve the construction of resilient wheels and to provide a simple, practical, and comparatively inexpensive spring wheel designed for use on automobile and other motor vehicles, traction engines and analogous machines as well as on street cars and various other conveyances and equipped with a plurality of cushioning springs located within the central portion of the wheel so as to be protected from dust, dirt and the like and arranged to distribute the various strains at all times throughout all of the springs so that no one of the springs will be subjected to excessive strain.

A further object of the invention is to provide a resilient wheel of this character adapted to obviate the necessity of employing pneumatic tires and capable of enabling solid rubber or other tires to be used and of affording the desired resiliency of pneumatic tires, without the use of such pneumatic tires.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

Figure 1:
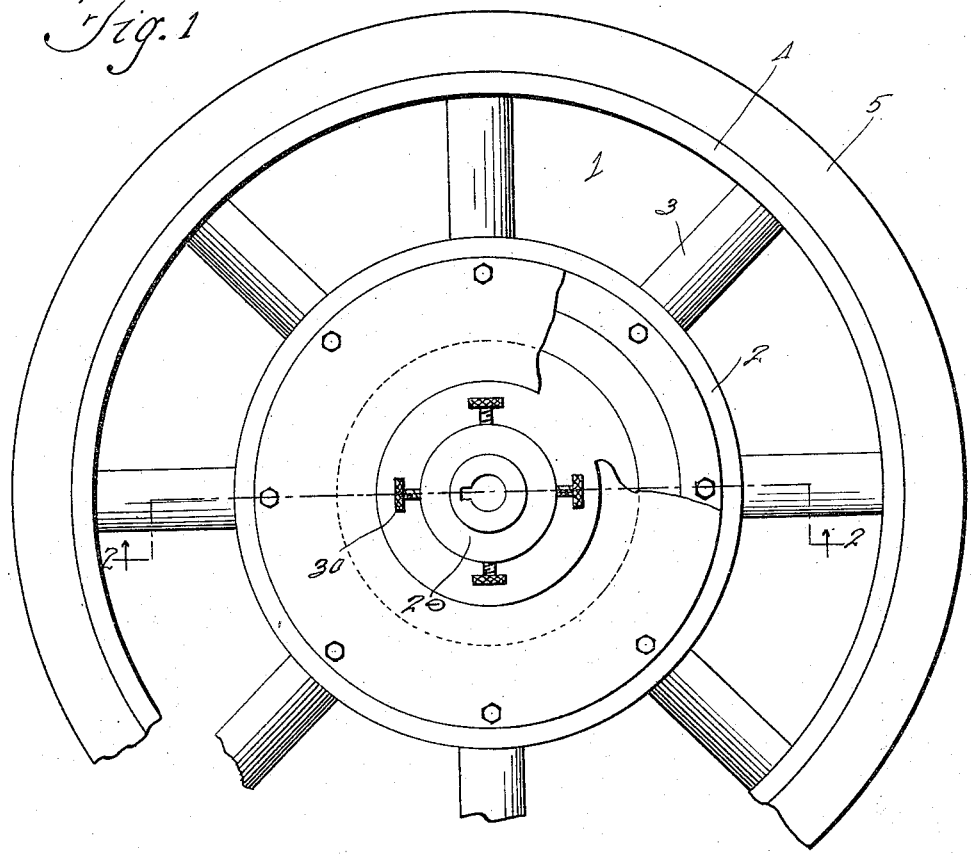
Figure 2:
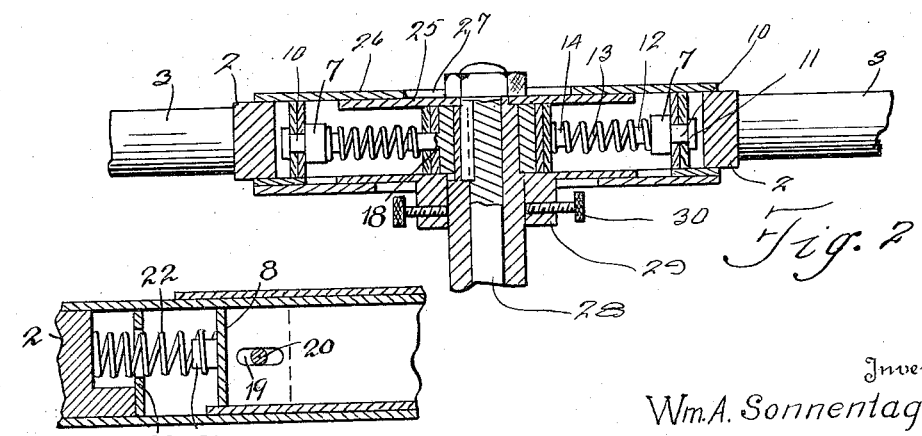
Figure 5:
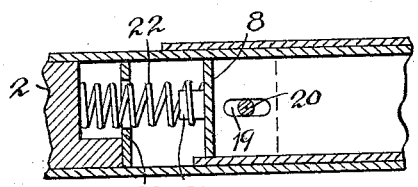

In the drawings, Figure 1 is an elevation of a wheel constructed in accordance with this invention, portions of the inner and outer side plates being broken away, Fig. 2 is a sectional view on the line 2—2 of Fig. 1, Fig. 3 is a sectional view taken at right angles to Fig. 2, Fig. 4 is an elevation illustrating another form of the resilient wheel, parts of the side plates being broken away, Fig. 5 is an enlarged detail sectional view illustrating the manner of mounting the outer coiled spring.

Like numerals of reference designate corresponding parts in all the figures of the drawings.

Referring particularly to Figs. 1 to 3 inclusive and Fig. 5, 1 designates a wheel provided with an inner rim 2 and having spokes 3 extending outwardly from and mounted on the inner rim and connected with an outer rim or felly 4 which carries a tire 5 of any desired construction. While the body of the wheel is shown provided with spokes 3 it may of course be of any other desired construction to adapt it for the character of vehicle or machine on which the wheel is to be used.

Within the rim 2 is arranged a hub ring 6 constructed of suitable metal and provided at diametrically opposite points with four relatively fixed blocks 7 projecting inwardly from the hub ring and forming lugs for the attachment of outer straight flat springs 8 which carry outer relatively movable blocks 9. The terminals of the straight flat springs 8 which are spaced apart by the outer relatively fixed blocks are connected by the same with the hub ring at spaced points around the same as clearly illustrated in Fig. 3 of the drawings.

The relatively fixed blocks are provided with shanks 10 which pierce the outer hub ring and which are secured to the same by being headed at 11 but any other suitable fastening means may of course be employed. The inner portions 12 of the relatively fixed blocks are reduced to fit in the outer ends of radially arranged coiled springs 13 which have their inner ends secured by bolts or screws 14 to inner blocks 15 mounted upon and extending outwardly from a central sleeve or member 16. The blocks may be secured to the sleeve or member 16 by the screws 14 or any other suitable means and the central sleeve member is adapted to receive an axle box or axle chain or it may be fixed to a driving shaft to enable the wheel to be applied to various kinds of machines and conveyances. The inner blocks also form seats for inwardly bowed springs 17 which may consist of flat bowed springs or a series of leaves as desired to adapt the wheel for sustaining the load to be carried and the said bowed springs which are provided with central openings 18 have terminal slots 19 for the reception of fastening devices 20 for securing the outer ends of the bowed springs to the yieldably mounted blocks 9. The yieldably mounted blocks 9 are provided with outer shanks 21 extending through the angularly related springs 8 and forming projections or studs for engaging the inner ends of outer coiled springs 22 extending from the straight angularly disposed connecting springs 8 to the hub ring 6. The hub ring 6 is preferably provided with openings 23 and the coiled springs 22 extend through the said openings 23 into sockets or recesses 24 formed in the inner rim 2 of the body of the wheel. The various springs coact in sustaining the load which is distributed throughout the various springs and carried by all the same so that in no position of the wheel is the load sustained only by one or two of the springs. This will enable lighter springs to be employed and the resiliency of the wheel will be thereby materially increased.

The springs are covered by inner and outer side plates 25 and 26 slidable on each other and connected respectively with the central hub member or sleeve and with the inner rim of the body portion of the wheel.

The outer plates 26 are preferably in the form of rings and have inner openings 27 of sufficient size to clear the central member and axle 28 of the wheel while the inner plates 25 are in the form of disks and may be arranged inside of the outer plates as clearly illustrated in Fig. 2 of the drawings or exteriorly of the same as hereinafter described. The inner plates are secured to the central member or sleeve, one of the inner plates being preferably fixed to the central member and the other being detachably mounted on the same by means of a collar 29 and set screws 30 but any other suitable means, however, may be employed for mounting the inner plates.

What is claimed is:—

1. A resilient wheel of the class described including a wheel body having an inner rim, an inner member arranged centrally with relation to the rim, oppositely bowed springs centrally connected with the central member, substantially straight springs extending across the space within the inner rim and engaged at their ends with the body portion of the wheel at the said inner rim, and means including a slotted connection for connecting the said springs to permit independent movement in a direction radially of the wheel.

2. A resilient wheel including a body having an inner rim, a hub ring arranged within the inner rim, substantially parallel straight springs extending across the space within the inner rim adjacent to the hub ring, an inner central member, bowed springs centrally connected with the inner member, and means for connecting the terminals of the bowed springs with the parallel springs at the center thereof, said connection including a slot to permit relative movement of the springs in a direction radially of the wheel.

3. A resilient wheel including a body portion having an inner rim, straight springs extending across the space within the inner rim and connected at their terminals with the same, a central member, bowed springs connected between their ends with the central member and at their terminals with the straight springs between the ends thereof and coiled springs seated against the bowed springs at the centers thereof and extending therefrom and connected with the straight springs at the terminals thereof.

4. A resilient wheel including a body portion having an inner rim, a central member, bowed springs connected between their ends with the central member and connected together at their ends and radially arranged coiled springs seated against the ends of the bowed spring and interposed between the same and the inner rim.

5. A resilient wheel including a body portion having an inner rim, straight springs extending across the space within the inner rim and connected at their terminals with the same, a central member, bowed springs connected between their ends with the central member and at their terminals with the straight springs between the ends thereof, inner coiled springs extending from the bowed springs to the straight springs at the terminals thereof, and outer coiled springs interposed between the straight springs and the rim and arranged centrally of the said straight springs.

6. A resilient wheel including a body portion, a hub ring arranged within the body portion and provided with relatively fixed lugs arranged at spaced points, substantially straight springs located within the hub ring and secured at their terminals to the same by the said lugs, a central sleeve provided with blocks, relatively fixed lugs carried by the straight springs, inner bowed springs secured to the blocks of the sleeves and having their terminals connected with the yieldably mounted blocks, coiled springs interposed between the relatively fixed blocks and the blocks of the sleeves, and other coiled springs interposed between the yieldably mounted blocks and the hub ring.

In testimony whereof I affix my signature in presence of two witnesses.

WILLIAM A. SONNENTAG.

Witnesses:
GEORGE NELSON,
JNO. W. MEYER.